United States Patent [19]

Tada

[11] Patent Number: 4,815,663

[45] Date of Patent: Mar. 28, 1989

[54] TRIGGER TYPE SPRAYER

[76] Inventor: Tetsuya Tada, 6-3, 2-chome, Kakinokizaka, Meguro-ku, Tokyo, Japan

[21] Appl. No.: 177,242

[22] Filed: Aug. 11, 1980

Related U.S. Application Data

[60] Continuation of Ser. No. 965,740, Dec. 4, 1978, abandoned, which is a division of Ser. No. 841,572, Oct. 12, 1977, Pat. No. 4,153,203.

[51] Int. Cl.[4] ........................ B05B 9/04; B65D 47/34; F16F 1/20

[52] U.S. Cl. .................................... 239/333; 222/383; 239/493; 267/71; 267/144; 267/165

[58] Field of Search ........................ 239/321, 333, 493; 222/207, 209, 324, 383; 267/70, 71, 144, 167, 165

[56] References Cited

U.S. PATENT DOCUMENTS

| | | | |
|---|---|---|---|
| 1,580,246 | 4/1926 | Heller | 239/333 |
| 3,120,347 | 2/1964 | Duke, Jr. | 239/333 X |
| 3,140,365 | 7/1964 | Voland | 267/165 X |
| 3,284,842 | 11/1966 | Jennings, Jr. | 267/165 |
| 3,762,647 | 10/1973 | Tada | 239/321 |
| 4,082,223 | 4/1978 | Nozawa | 239/333 |
| 4,153,203 | 5/1979 | Tada | 239/333 |
| 4,273,290 | 6/1981 | Quinn | 239/493 |

*Primary Examiner*—Andres Kashnikow

*Attorney, Agent, or Firm*—Frishauf, Holtz, Goodman & Woodward

[57] ABSTRACT

A trigger type sprayer which comprises a sprayer body whose inner lateral walls are provided with a pair of mutually facing engagement grooves, and wherein a trigger of the sprayer has a notch cut out in the upper end portion of the front wall and a pair of lugs formed on the outside of the upper end portions of the lateral walls. A nozzle fixed to the sprayer body extends outward through the notched portion of the trigger, and has a pair of axially extending stoppers integrally formed on the outer surface of the nozzle. The trigger can be rotatably connected to the sprayer body with ease due to the paired lugs being snap-fitted to the engagement grooves of the sprayer body and the upper end portions of the lateral walls of the trigger are prevented from being thrown inward by the stoppers of the nozzle and inconsequence coming off the sprayer body.

7 Claims, 4 Drawing Sheets

TRIGGER TYPE SPRAYER

This is a continuation of application Ser. No. 965,740 filed Dec. 4, 1978, now abandoned, which in turn is a Divisional Application of Ser. No. 841,572 filed on Oct. 12, 1977, now U.S. Pat. No. 4,153,203, which issued on May 8, 1979.

This invention relates to a sprayer for sucking up a liquid received in a container and ejecting the liquid under pressure, and more particularly to a trigger type sprayer.

In the field of manufacturing a sprayer, improvements are made from the standpoint of elevating the performance of the sprayer and also facilitating its assembly by decreasing a number of parts and simplifying the arrangement of the parts.

A large number of high pressure sprayers have already been proposed for improvement of performance in which high pressure spray is sustained from the beginning to the end without being affected by the sliding speed of a piston or pressure applied to the piston. There is also put to practical use a dispenser or sprayer in which a nozzle hole is sealed by sealing means to prevent the leakage of a spray liquid while the spraying device is not applied, for example, during transitor exposition.

Fewer improvements have been made on the assembling phase of a sprayer than on the technical phase thereof. An improvement on the construction of a sprayer includes, for example, a trigger actuated pump set forth in the U.S. Pat. No. 3,749,290 (allowed to Micallof on July 31, 1973) in which the cylinder is formed of a flexible tubular member, and the upper edge of the tubular cylinder acts as a second valve. Though simply constructed with a sufficiently small number of parts to admit of easy assembly, the trigger actuated pump has the drawback that the liquid contained in the pump is pressurized only by the deformation of the flexible cylinder, failing to be sprayed at a fully high pressure.

It is accordingly an object of this invention to provide a trigger type sprayer easy of assembly which enables the liquid to be sprayed at a fully high pressure.

It is another object of the invention to provide a trigger type sprayer which not only admits of easy assembly, but also prevents liquid from leaking to the outside when not in use.

Other objects, features and advantages of this invention will become apparent as the description thereof proceeds when considered in connection with the accompanying drawings.

FIG. **2*a*** is a rear view of the trigger;

FIG. **2*b*** is a longitudinal sectional view on line II*b*—II*b* of FIG. **2*a*;**

Figure 3:
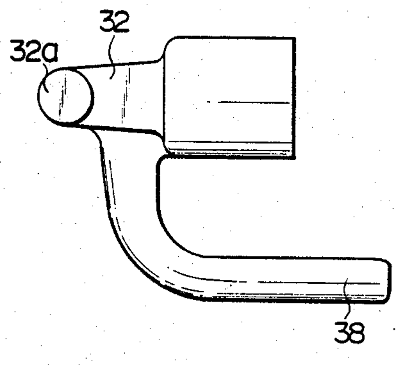
Figure 4A:
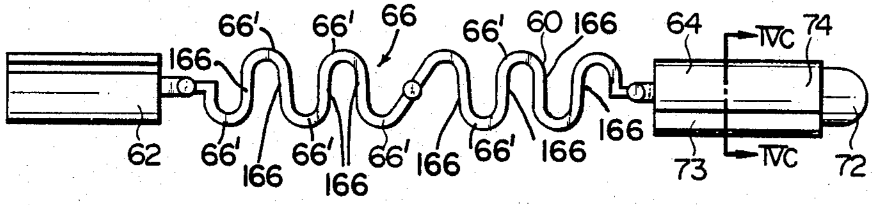

FIG. 3 is a side view of the piston;

FIG. **4*a*** is a side view of a spinner assembly;

FIG. **4*b*** is a front view of a spinner body of the spinner assembly;

FIG. **4*c* is a cross sectional view on line IVC—IVC of FIG. 4*a*;**

Figure 1:
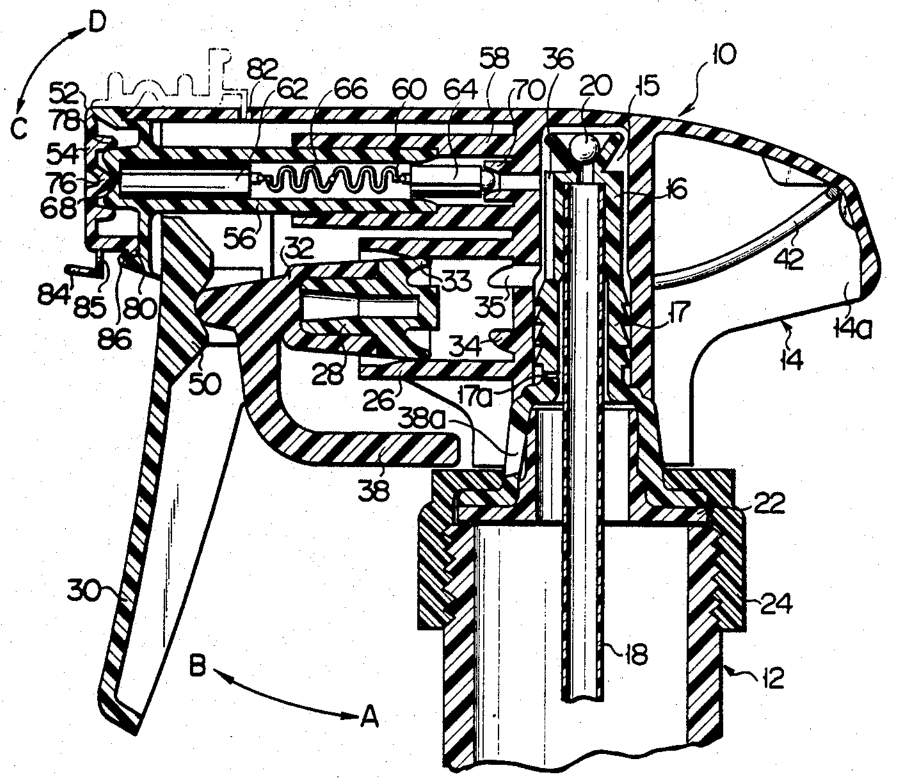
FIG. 1 is a longitudinal sectional view of a trigger type sprayer embodying this invention.
Figure 6:
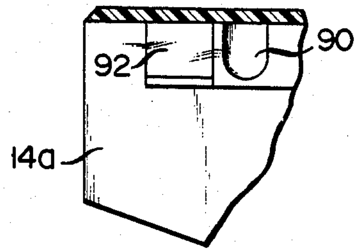
Figure 7:
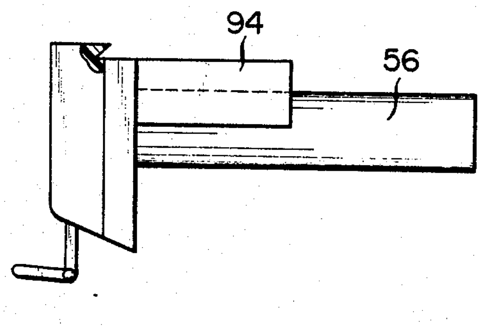
Figure 8:
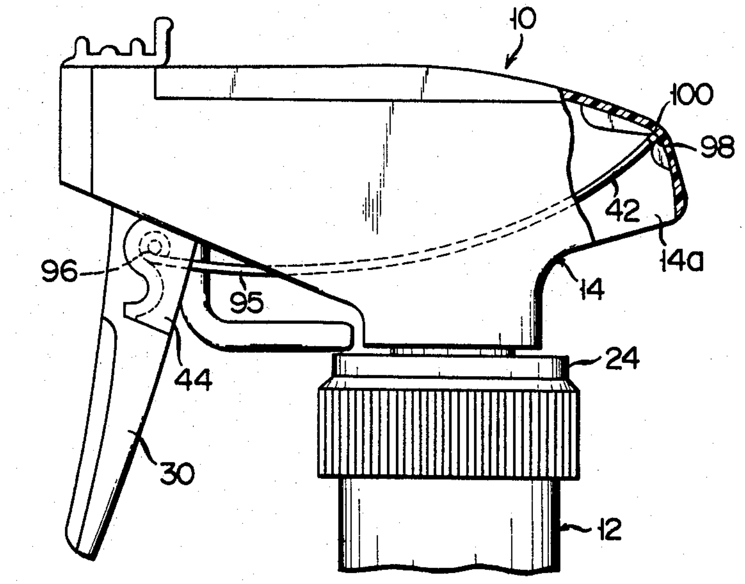

FIG. **5*a* is a fragmentary sectional view of a modification of a nozzle used with the trigger type sprayer of FIG. 1**;

FIG. **5*b*** is a fragmentary sectional view of another modification of the nozzle;

FIG. **5*c*** is an enlarged fragmentary sectional view of a modified central portion of the nozzle;

FIG. 6 is a fragmentary sectional view of the sprayer body;

FIG. 7 is a side view of the nozzle of FIG. 1;

FIG. 8 is a partly exploded side view of the sprayer of FIG. 1; and

Figure 9:
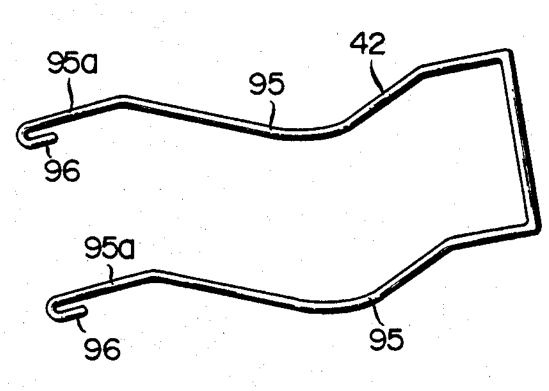

FIG. 9 is a perspective view of a modification of a U-shaped wire spring.

DETAILED DESCRIPTION

Referring to FIG. 1, a sprayer 10 embodying this invention comprises a container 12 filled with a liquid, and a sprayer body 14 fitted to the container 12. A bore 15 formed in the sprayer body 14 receives a cylindrical valve case 16. The outer peripheral surface of the valve case 16 is provided with a plurality of parallel encircling half wave-shaped threads 17, namely, the threads, one half of whose crest portion is cut off. This arrangement causes the cylindrical valve case 16 to be easily inserted into the bore 15 but to be drawn off therefrom with considerable difficulty, thereby enabling the cylindrical valve case 16 to be securely fixed in place. A drain hole **17*a* is provided below the lowermost half-wave shaped thread 17. Therefore, the liquid which happens to leak out through the threads 17 is brought back into the container 12 through the drain hole 17a. Further provided in the cylindrical valve case 16 is a suction pipe 18 for sucking up the liquid from the container 12. Both end portions of the cylindrical valve case 16 are made into the flare form. The upper flare portion is used as a seal for a primary valve 20. The lower flare portion is fitted with a negative pressure packing 22 made of elastic material such as polyethylene. A tightening ring 24 is threadedly fitted to the container 12 with the cylindrical valve case 16 and negative packing 22 pressed toward the upper end of the container 12**.

A piston body 28 is slidably received in a cylinder 26 integrally formed with the sprayer body 14. A trigger or lever 30 is rotatably fitted to the sprayer body 14. An engagement member 32 jointly moving with the lever 30 by snap engagement holds the piston body 28. The piston holder or snap engagement member 32 and piston body 28 collectively constitute a piston. Formed on the base of the cylinder 26 is an annular projection 34 loosely engageable with the sealed edge 33 of the piston body 28. When, therefore, the piston is forced into the cylinder 26, a dead space does not arise in the cylinder 26, preventing the generation of air bubbles. A passageway 35 is bored crosswise through the annular projection 31 for the influx of the liquid into the cylinder 26 and its efflex therefrom. A groove 36 extending lengthwise of the cylindrical valve case 16 is cut out in part of the peripheral surface of the upper portion of the case 16 for communication to the passageway 35. A negative pressure rod 38 projects from the snap engagement member 32. When the lever 30 is rotated in the direction A, the negative pressure rod 38 is inserted into a negative pressure hole 38a to depress the elastic packing 22. As the result, the upper end of the packing 22 is partly separated from the inner wall of the cylindrical valve case 16 to provide an air influx passageway, thereby preventing the generation of negative pressure in the container 12.

As shown in FIGS. **2*a* and 2*b*, a notch 39*a* is cut out in the front wall 39 of the lever 30. The lateral walls 40** of the lever 30 are shaped like a fork. Cylindrical lugs 41 are integrally formed on the outside of the upper portions of the lateral walls 40. Flat boards 44, spatially extending parallel with the lateral walls 40 of the lever 30, for receiving the ends of a pair of arms of a U-shaped wire spring 42 (FIG. 1) are integrally formed on the outside of the intermediate section of the lateral walls 40 of the lever 30. The lever 30 is normally urged in the direction B of FIG. 1 by the biasing force of the wire spring 42. Integrally formed in those portions of the inner lateral walls of the lever 30 which occupy substantially the same position as the projecting flat boards 44 are a pair of mutually facing convex portions 48, each of which is provided a groove extending perpendicularly to the axis of the lever 30 to receive the cylindrical lug 32*a* (FIG. 3) of the piston. A stopper or projecting guide member 50 for restricting the insertion of the cylindrical lug 32*a* is integrally formed on the inside of the front wall 39 of the lever 30. The mutually facing convex portions 48 are each provided with a sloping plane 49 to facilitate the insertion of the cylindrical lug 32*a*.

As shown in FIG. 1, a cylindrical holder 58 of a nozzle 56 whose nozzle cover 54 is integrally formed through a hinge 52 is integrally formed with the sprayer body 14 above the cylinder 26. The cylindrical nozzle holder 58 constitutes a passageway through which a pressurized liquid flows from the cylinder 26 to the nozzle 56. The nozzle 56 contains a spinner assembly 60. The spinner assembly 60 comprises, as shown in FIG. 4*a*, a spinner body 62, cylindrical secondary valve 64 and a compression spring 66 stretched between the spinner body 62 and cylindrical secondary valve 64. These three members are integrally prepared by injection molding from synthetic resin such as polypropylene. The compression spring 66 should preferably be made into a wave form in consideration of the mechanical strength and the ease of machining a metal mold. The integral formation of the spinner, secondary valve and compression spring decreases a number of parts of a sprayer and admits of its easy assembly. When the spinner assembly is molded, it is preferred in view of the unavoidable presence of residual gate strips that molten synthetic resin be carried to the mold cavities corresponding to the spinner body 62 and secondary valve 64 through the gate adjacent to the wave-shaped compression spring 66 and the mold cavity corresponding to the compression spring 66. The biasing force of the central wave-shaped compression spring 66 presses the spinner body 62 toward the end of the nozzle 56 bored with an ejection hole 68, and the secondary valve 64 toward an annular valve seat 70 formed on the base of the cylindrical nozzle holder 58.

Figure 4B:
Figure 4C:
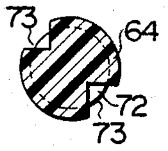

The wave-shaped compression spring 66 comprises a plurality of generally semi-circular portions 66' interconnected by substantially straight portions 166. The secondary valve 64 should preferably comprise, as shown in FIGS. 4*a* to 4*c*, a partly spherical smaller diameter section 72 capable of abutting against the corresponding valve seat and a cylindrical larger diameter section 74 which is integrally formed with the smaller diameter section 72 and whose peripheral surface is provided with axially-extending grooves 73. A prescribed number (two in the foregoing embodiment) of the grooves 73 are provided in consideration of the anticipated amount of a liquid sprayed for each application of a sprayer and the kind of the liquid used.

As seen in FIG. 4*a*, the compression spring 66 has opposite ends which are integrally connected respectively to the secondary valve 64 and the spinner body 62. The opposite ends of the compression spring 66 are substantially centered, at least in the plane containing the directions of undulations of the compression spring 66, respectively on the secondary valve 64 and on the spinner body 62.

Where the secondary valve 64 is constructed as described above, a pressurized liquid flowing into the cylindrical nozzle holder 58 easily and quickly runs into the nozzle 56 through a large empty space defined by the grooves 73 when the secondary valve 64 is detached from the valve seat 70, thereby effecting a fully satisfactory spray through the ejecting hole 68.

The nozzle cover or seal means 54 integrally formed with the nozzle 56, with the hinge 52 interposed therebetween, is engaged with the nozzle or locks it when the sprayer 10 is not applied, thereby sealing the ejection hole 68 in liquid-tightness. When the sprayer is applied, the nozzle cover 54 is locked to the upper surface of the sprayer body 14, allowing a liquid to be sprayed from the ejection hole 68. To describe in greater detail, the nozzle cover 54 comprises a central seal section 76 which is rotated about the hinge 52 in the direction C to seal the ejection hole 68 of the nozzle 56 in liquid-tightness by being locked to the nozzle 56 and an annular flange 78 to clamp the nozzle 56 from its periphery to sustain the liquid-tight condition of the ejection hole 68. The flange 78 may be a fractional flange strip instead of taking a fully annular form. The nozzle cover 54 further comprises a first lock section 80 for locking the nozzle cover 54 to the nozzle 56 by engagement with the inner edge of a projecting engagement member formed on the nozzle 56 and a second lock section 84 for locking the nozzle cover 54 to the sprayer body 14 by engagement with an engagement hole 82 bored in the upper surface of the sprayer body 14. The second lock section 84 takes a horizontally reversed L-shape. The base of the lock section 84 acts as a lever 85 when the nozzle cover 54 is rotated. When the lever 85 is rotated in the direction D, the nozzle cover 54 is disengaged from the nozzle 56.

Where the sprayer 10 is not used during packaging, transit or exposition, the nozzle cover 14 brings the first lock section 80 into engagement with the corresponding engagement section 86 of the nozzle 56 and maintains the lock position. Where the sprayer 10 is applied, the nozzle cover 54 is disengaged from the nozzle 56 by rotating the lever 85 in the direction D. While the sprayer 10 is applied, the nozzle cover 54 engages the sprayer body 14 by bringing the second lock section 84 of the nozzle cover 54 into engagement with the corresponding engagement hole 82 of the sprayer body 84. Where the sprayer 10 is kept in storage after application in a state ready for the succeeding use, the nozzle cover 54 is rotated about the hinge 52 in the direction C with the first lock section used as a lever. As the result, the first lock section 80 is brought into engagement with the corresponding engagement section 86 of the nozzle 56, thereby causing the nozzle cover 54 to be locked to the nozzle 56.

Figure 5A:
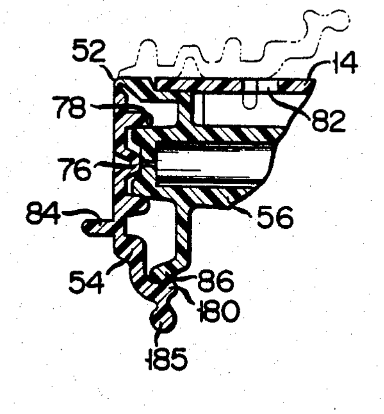
Figure 5B:
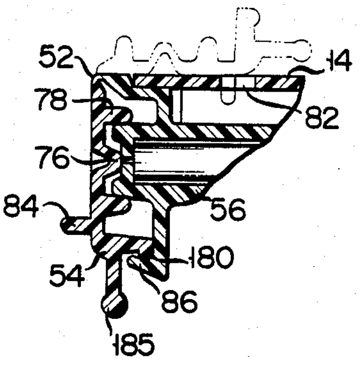

The sprayer of this invention is not limited to the type shown in FIG. 1, but may be applicable in many other modifications provided with a different form of nozzle cover without departing from the technical concept of the invention. As shown in FIG. 5*a*, it is possible to bring a first lock section 180 of the nozzle cover 54 into engagement with the outer edge of the corresponding engagement section of the nozzle 56 and cause a lever section 185 to project downward from the first lock section 180. This arrangement enables the lever section 185 to be used as such when the nozzle cover 54 is unlocked either from the nozzle 56 or from the sprayer body 14. The lever section 185 is also applicable as such, as shown in FIG. 5*b*, when the first lock section 180 is engaged with the inner edge of the engagement section 86 of the nozzle 56.

Figure 5C:
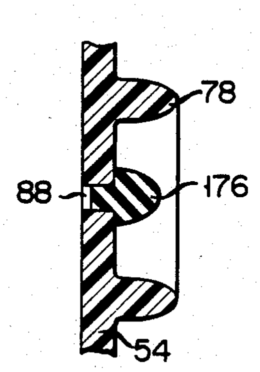

If, as shown in FIG. 5*c*, a hole 88 is bored at the center of the nozzle cover 54 and a semispherical seal 176 prepared from elastic material like rubber is fitted into the central hole 88, then the ejection hole 68 can be more reliably sealed in liquid-tightness.

As mentioned above, integral formation of the nozzle cover or seal means 54 with the nozzle 56 makes it possible to decrease a number of parts, admitting of the easy assembly of a sprayer. Further, the nozzle cover 54 which rotates about the hinge 52 can repeatedly seal the ejection hole 68 in liquid-tightness. Where the sprayer 10 is not applied, the lock means causes the nozzle cover 54 to be engaged with the nozzle 56 to seal the ejection hole 68 in liquid-tightness. Where the sprayer 10 is used, the lock means causes the nozzle cover 54 to be locked to the sprayer body 14, thereby exposing the ejection hole 68. The nozzle cover 54 designed as described above increases the practical efficiency and economic value of a sprayer without losing its attractiveness.

Figure 2A:
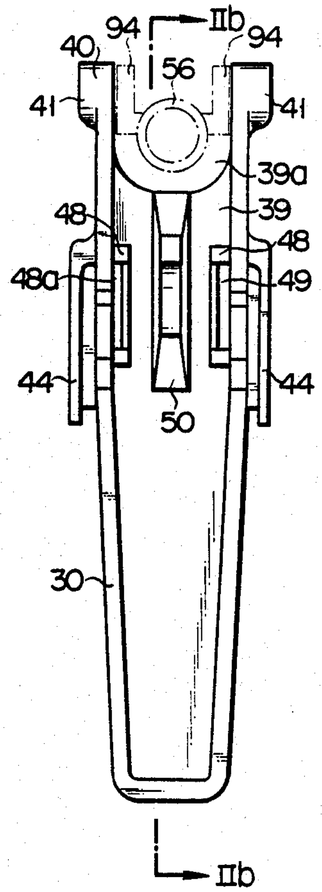
Figure 2B:
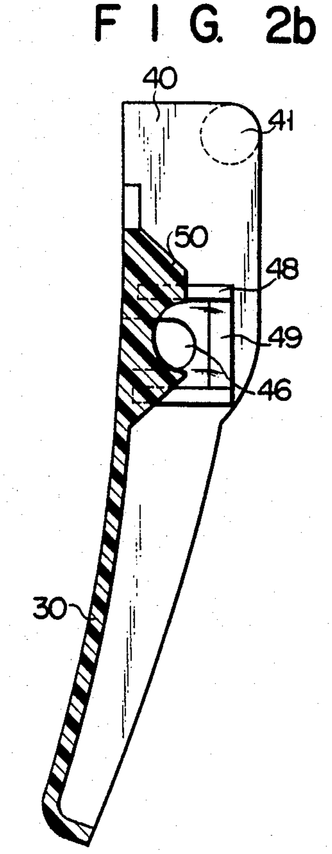

A pair of longitudinal engagement grooves 90 for receiving the paired lugs 41 (FIG. 2*a*) formed on the trigger or lever 30 are provided, as shown in FIG. 6, in the lateral walls 14*a* of the sprayer body 14. A sloping plane 92 is formed ahead of each of the paired longitudinal engagement grooves 90 to facilitate the engagement of the lug 41 with the groove 90. The upper portion of the lateral wall 40 of the lever 30 is made fully elastic due to a notch 39a being cut out in the upper end portion of the front wall 39 of the lever 30. Where, therefore, the lug 41 is to be fitted into the engagement groove 90, the upper portion of the lever 30 can be thrown inward, enabling the lever 30 to be easily coupled to the sprayer body 14. The lugs 41 about which the lever 30 rotates are liable to come off the engagement grooves 90 during the rotation of the lever 30, because its elasticity exerts an adverse effect. To prevent the disengagement of the lugs 41 from the grooves 90, the nozzle 56 has a pair of stoppers, for example, flat boards 94 (FIG. 7) extending along the axis of the nozzle 56. As shown in a phantom in FIG. 2*a*, each of the stopper boards 94 extends through the notch 39*a* of the front wall 39 of the lever 30 to abut against the inside of the upper portion of the lateral wall 40 of the lever 30, thereby preventing the upper portion from being thrown inward and in consequence the lever 30 from coming off the sprayer body 14.

There will now be described the operation of assembling the sprayer 10 having the above-mentioned construction. The undermentioned sequential steps of the assembling work are described simply for illustration. Obviously, the parts of the sprayer 10 can be assembled in a different order.

First, there is inserted into the bore 15 of the sprayer body 14 the cylindrical valve case 16 in which the primary valve 20 is received in the upper flare portion of the case 16, and the tightening ring 24 is fixed to the flange of the lower flare portion. The negative pressure packing 22 is fitted to the lower flare portion of the valve case 16 and the suction pipe 18 is inserted thereinto.

The piston body 28 is securely set in the engagement member 32. The lug 32*a* of the engagement member 32 is fitted into the groove 46 extending crosswise of the lever 30 by being caused to slide over the sloping plane 49. While the piston is inserted into the cylinder 26, the lugs 41 of the lever 30 are brought into engagement with the longitudinal grooves 90 cut out in the lateral walls 14*a* of the sprayer body 14 by being caused to slide over the corresponding sloping planes 92. The U-shaped wire spring 42 is received in the sprayer body 14 with the ends of the arms of the spring 42 inserted into the projecting flat boards 44 of the lever 30. The nozzle 56 containing the spinner assembly 60 is inserted into the cylindrical nozzle holder 58, thereby completing the assembly of the sprayer 10. The sprayer 10, when fully constructed, is fitted to the liquid container 12 by the threaded engagement of the tightening ring 24 with the liquid container 12.

According to this invention, the trigger or lever is fitted to the sprayer body by causing the lugs formed on the outside of the upper portions of the fork-shaped lateral walls of the lever to be engaged with the engagement grooves cut out in the inside of the lateral walls of the sprayer body. The nozzle extends between the fork-shaped lateral walls of the lever. Since the forked section of the upper lateral walls of the lever is made large, the upper lateral walls have a high elasticity, admitting of the easy, quick assembly of the sprayer. Further, the nozzle extending between the fork-shaped lateral walls of the lever are provided with integral stopper boards to prevent the upper lateral walls of the lever from being thrown inward. Therefore, though the upper lateral walls of the lever have a high elasticity, the lever does not come off the engagement grooves. Further according to this invention, the paired lugs formed on the piston are fitted into the engagement grooves provided in the lateral walls of the lever. The cylindrical valve case is securely forced into the sprayer body. Therefore, substantially all the parts of the sprayer are efficiently assembled by engagement or insertion underpressure. In this case, the engagement grooves may be of the blind recess type or penetrating hole type.

As shown in FIG. 8, the curled tips 96 of the arm sections 95 of the wire spring 42 are received in the projecting flat boards 44 of the lever 30. The shoulder portion 98 of the wire spring 42 to which the arm sections 95 are connected is fitted into a horizontal groove 100 cut out in the inner wall of the rear section of the sprayer body 14. The curved walls of the boards 44 and the horizontal groove 100 have such a curvature as promotes the deformation of the wire spring 42. Completely to shut off the wire spring 42 from the outside by the lateral walls 14*a* of the sprayer body 14, it is preferred that the wire spring 42 be so shaped as to cause the portions adjacent to the curved tips 96 to constitute rising portions 95*a* as illustrated in FIG. 9.

What is claimed is:

1. In a trigger type sprayer which comprises a sprayer body provided with a cylinder through which a piston slides, said sprayer body being engageable with a liquid container; a trigger rotatably coupled to said sprayer body; a nozzle having a passageway through which a pressurized liquid flows and an ejection hole in communication with said passageway, said nozzle being coupled to said sprayer body; and spring means coupled to said trigger for urging said trigger outward;

the improvement comprising:

an elongated spinner assembly means integrally and unitarily formed of synthetic resin and received in said nozzle for imparting a spinning motion to the pressurized liquid before it reaches said ejection hole of said nozzle, said spinner assembly comprising:

a secondary valve portion means for shutting off communication between said passageway and said ejection hole of said nozzle;

a spinner portion means in said passageway for imparting said spinning motion to said pressurized liquid; and a wave-shaped, sinuous compression spring member including at least three oppositely directed, open, substantially semicircular portions, said substantially semicircular portions extending adjacent one another in the longitudinal direction of said elongated spinner assembly means and adjacent substantially semicircular portions being oppositely directed and integrally connected to each other, said compression spring member being integrally connected between said secondary valve portion means and said spinner portion means for urging said secondary valve portion means and said spinner portion means away from each other and for thereby urging said spinner portion means against said ejection hole;

said compression spring member being wave-shaped and sinuous over substantially the entire length of said compression spring member and comprising said substantially semicircular portions adjacent one another over substantially the entire length of said compression spring member; and said compression spring member having opposite ends which are integrally connected respectively to said secondary valve portion means and to said spinner portion means, said opposite ends being substantially centered, at least in the plane containing the directions of undulations of said compression spring member, respectively on said secondary valve portion means and on said spinner portion means.

2. The trigger type sprayer of claim 1, wherein said secondary valve portion means comprises an at least partly spherical section of given diameter and which is adapted to abut against an associated valve seat; and a section of larger diameter than said at least partly spherical section, said larger-diameter section being integrally formed with said smaller diameter at least partly spherical section.

3. The trigger type sprayer of claim 2, wherein said spinner portion means has a groove on an outer surface thereof which extends axially of said passageway for passing liquid to be sprayed.

4. The trigger type sprayer of claim 2, wherein said spinner portion means comprises a liquid passing space defined between an outer surface thereof and an inner surface portion of said passageway, said liquid passing space extending axially of said passageway for passing liquid to be sprayed through said space.

5. The trigger type sprayer of claim 1, wherein said wave-shaped member comprises a wave-shaped plate spring member.

6. The trigger type sprayer of claim 1, wherein said secondary valve portion means has a groove on the outer surface thereof which extends axially of said passageway for passing liquid to be sprayed.

7. The trigger type sprayer of claim 1, wherein said secondary valve portion means comprises a liquid passing space defined by an outer surface thereof, said liquid passing space extending axially of said passageway for passing liquid to be sprayed through said space.

* * * * *

UNITED STATES PATENT AND TRADEMARK OFFICE

CERTIFICATE OF CORRECTION

PATENT NO. : 4,815,663

DATED : March 28, 1989

INVENTOR(S) : TADA

It is certified that error appears in the above-identified patent and that said Letters Patent is hereby corrected as shown below:

Title page, left-hand column, insert -- Foreign Application Priority Date

| | | |
|---|---|---|
| March 2, 1977 | Japan | 52-22437 |
| March 30, 1977 | Japan | 52-38952(U) |
| May 24, 1977 | Japan | 52-66706(U) |
| June 28, 1977 | Japan | 52-85695(U) -- |

Signed and Sealed this

Twentieth Day of February, 1990

*Attest:*

JEFFREY M. SAMUELS

*Attesting Officer* *Acting Commissioner of Patents and Trademarks*